(12) United States Patent
Sato

(10) Patent No.: US 12,467,731 B2
(45) Date of Patent: Nov. 11, 2025

(54) ROTARY ENCODER, ROTARY ENCODER SYSTEM, AND ROTATION ANGLE DETECTION METHOD USING ROTARY ENCODER

(71) Applicant: Magnescale Co., Ltd., Kanagawa (JP)

(72) Inventor: Akihiko Sato, Kanagawa (JP)

(73) Assignee: Magnescale Co., Ltd., Kanagawa (JP)

( * ) Notice: Subject to any disclaimer, the term of this patent is extended or adjusted under 35 U.S.C. 154(b) by 183 days.

(21) Appl. No.: 18/431,600

(22) Filed: Feb. 2, 2024

(65) Prior Publication Data

US 2024/0263934 A1    Aug. 8, 2024

(30) Foreign Application Priority Data

Feb. 7, 2023   (JP) .................. 2023-016888

(51) Int. Cl.
  *G01B 7/30*    (2006.01)
  *G01D 5/16*    (2006.01)

(52) U.S. Cl.
  CPC .................. *G01B 7/30* (2013.01); *G01D 5/16* (2013.01)

(58) Field of Classification Search
  CPC ............ G01D 5/12; G01D 5/16; G01D 5/244; G01D 5/24471; G01D 5/2449; G01D 5/245; G01D 5/2451; G01B 7/30
  See application file for complete search history.

(56) References Cited

U.S. PATENT DOCUMENTS

| 2015/0019152 A1* | 1/2015 | Scheibenzuber .... G01D 5/2448 702/94 |
| 2017/0030742 A1* | 2/2017 | Mochizuki ......... G01D 5/24476 |
| 2019/0204063 A1* | 7/2019 | Ausserlechner ......... G01D 5/16 |

FOREIGN PATENT DOCUMENTS

| JP | 6386368 B | 9/2018 |
| JP | 2022-184555 A | 12/2022 |

* cited by examiner

*Primary Examiner* — Huy Q Phan
*Assistant Examiner* — David B Frederiksen
(74) *Attorney, Agent, or Firm* — IP Business Solutions, LLC.

(57) ABSTRACT

A rotary encoder 1 includes a rotary scale 2 having a cylindrical surface 2a as a detected surface and having a relative angle track 2b formed circumferentially on the cylindrical surface 2a, a sensor head 3 arranged with an interval from the cylindrical surface 2a and detecting the relative angle track 2b and outputting a detection signal, and a first angle calculator 4 calculating a rotation angle of the rotary scale 2 based on the detection signal from the sensor head 3. The rotary encoder 1 includes an angle error storage 7 storing an angle error corresponding to the size of the interval at each rotation angle calculated based on the detection signal from the sensor head 3, and an angle compensator 8 compensating the rotation angle calculated by the first angle calculator 4 based on the angle error at each rotation angle stored in the angle error storage 7.

17 Claims, 7 Drawing Sheets

ROTARY ENCODER, ROTARY ENCODER SYSTEM, AND ROTATION ANGLE DETECTION METHOD USING ROTARY ENCODER

TECHNICAL FIELD

The present invention relates to a rotary encoder that is connected to a rotating shaft of a rotating body as a detection target to detect a rotation angle of the rotating body about the rotating shaft.

BACKGROUND ART

A conventionally known rotary encoder includes, for example, a rotary scale, a sensor head, and an angle calculator. The rotary scale has a relative angle track formed circumferentially on a cylindrical surface as a detected surface thereof, and the relative angle track indicates relative angle information on a scale. The sensor head is arranged to face the rotary scale. The sensor head detects the relative angle track and outputs a detection signal corresponding to the relative angle track. The angle calculator calculates a rotation angle based on the detection signal output from the sensor head.

The thus-configured rotary encoder is used with the rotary scale coaxially coupled to a rotating shaft of a rotating body as a detection target. The rotary scale rotates together with the rotating body, whereby a rotation angle of the rotating body is detected.

However, it is difficult to coaxially couple the rotary scale to the rotating shaft of the rotating body with high accuracy. To be precise, the rotary scale is coupled in a slightly eccentric position to the rotating shaft of the rotating body. This causes a mismatch to occur between the rotation angle of the rotating body and the wavenumber of the detection signal during one rotation of the rotary scale, which causes an error to be included in the rotation angle calculated by the angle calculator.

In addition, the cylindrical surface, i.e., the detected surface, of the rotary scale may become deformed. Such deformation also causes a mismatch to occur between the rotation angle of the rotating body and the wavenumber of the detection signal, which also causes an error to be included in the rotation angle calculated by the angle calculator.

Therefore, a method as disclosed in Japanese Patent No. 6386368 has been proposed that uses, for example, two sensor heads. In this method, the two sensor heads are respectively arranged at 0°-phase and 180°-phase rotation angle positions in the rotating direction of the rotary scale with respect to the rotary scale, and the rotation angles calculated based on the detection signals output from the sensor heads are averaged. Thereby, a primary error component caused by eccentricity of the rotary scale is reduced. In this disclosed method, using six sensor heads enables error components up to the 32nd order to be reduced.

SUMMARY OF INVENTION

The method disclosed in Japanese Patent No. 6386368 is advantageous in that the detection accuracy is improved. However, since the compensable error order is determined by the number of sets of sensor heads to be used, a larger number of sensor heads are required in order to further improve the measurement accuracy. This complicates the structure of the rotary encoder and increases the manufacturing cost of the rotary encoder. In these respects, the method is disadvantageous.

The present invention has been achieved in view of the above-described circumstances, and an object of the invention is to provide a rotary encoder, a rotary encoder system, and a rotation angle detection method using a rotary encoder, each of which enables a detection error caused by eccentricity or deformation of the rotary scale to be compensated without increase in the number of sensor heads to be used.

To solve the above, the present invention provides a rotary encoder including:

a rotary scale that is connected to a rotating shaft of a rotating body as a detection target and has a cylindrical surface as a detected surface disposed with a center axis thereof parallel to the rotating shaft and that has a relative angle track formed circumferentially on the cylindrical surface to indicate relative angle information;

a sensor head that is arranged to face the cylindrical surface of the rotary scale with an interval therebetween and that detects the relative angle track formed on the cylindrical surface of the rotary scale and outputs a detection signal corresponding to the relative angle track and varying in accordance with a size of the interval;

a first angle calculator that calculates a rotation angle of the rotary scale based on the detection signal output from the sensor head;

an angle error storage that stores an angle error corresponding to the size of the interval at each rotation angle calculated based on the detection signal output from the sensor head; and an angle compensator that compensates the rotation angle calculated by the first angle calculator, based on the angle error at each rotation angle stored in the angle error storage.

The rotary encoder according to this aspect (first aspect) is used with the rotary scale coupled to a rotating shaft of a rotating body as a detection target. The rotary scale rotates together with the rotating body, so that a detection signal is continuously output from the sensor head arranged to face the cylindrical surface of the rotary scale. The detection signal corresponds to the relative angle track and varies in accordance with the size of the interval between the sensor head and the cylindrical surface of the rotary scale.

The detection signal continuously output from the sensor head is processed by the first angle calculator. The first angle calculator sequentially calculates a rotation angle of the rotary scale, that is to say, a rotation angle of the rotating body, based on the detection signal and outputs the calculated rotation angle as primary angle information. Thereafter, the primary angle information continuously output from the first angle calculator is processed by the angle compensator. The angle compensator recognizes an angle error corresponding to the rotation angle input from the first angle calculator by referring to the angle error at each rotation angle stored in the angle error storage and sequentially compensates the rotation angle continuously input from the first angle calculator based on the recognized angle error.

Thus, this rotary encoder is capable of compensating for the angle error corresponding to the size of the interval between the rotary scale and the sensor head. Therefore, even if the gap between the rotary scale and the sensor head varies during one rotation of the rotary scale due to the rotary scale being coupled in an eccentric position or in a deformed state to the rotating shaft of the rotating body or due to the cylindrical surface as the detected surface of the rotary scale having become eccentric or deformed over time, the rotation angle of the rotary scale, that is to say, the rotation angle of the rotating body as the detection target, can be detected with an expected high accuracy.

Further, unlike the conventional rotary encoder, this rotary encoder enables the highly accurate rotation angle detection without increase in the number of sensor heads. Therefore, the structure of the rotary encoder is not complicated and a great increase in the manufacturing cost of the rotary encoder is prevented.

The rotary encoder according to the first aspect described above may be configured according to the following aspect (second aspect): the rotary encoder further includes an angle error calculator that calculates an angle error corresponding to the size of the interval (gap) between the rotary scale and the sensor head at each rotation angle calculated from the detection signal output from the sensor head based on a correlation between the size of the interval and a magnitude of the detection signal as well as the detection signal and stores the calculated angle error into the angle error storage.

Alternatively, the rotary encoder according to this second aspect may be configured according to the following aspect (third aspect): the rotary encoder further includes an error information storage that stores the correlation between the size of the interval and the magnitude of the detection signal; and the angle error calculator is configured to calculate the angle error by referring to the correlation between the size of the interval and the magnitude of the detection signal stored in the error information storage.

Further, the rotary encoder according to this third aspect may be configured according to the following aspect: the angle error calculator is configured to update the angle error stored in the angle error storage by replacing the angle error with a new angle error calculated for every one rotation of the rotary scale. In this aspect (fourth aspect), the angle compensator can compensate the rotation angle output from the first angle calculator with the most recent angle error. Therefore, the rotation angle of the rotary scale (the rotating body as the detection target) can be detected with high accuracy without being accompanied by accuracy deterioration over time.

Further, the rotary encoders according to the first through fourth aspects described above may be configured according to the following aspect:
- the rotary scale has an absolute angle track formed adjacent to the relative angle track on the cylindrical surface to indicate absolute angle information;
- the sensor head is configured to detect the absolute angle track besides the relative angle track and output a detection signal corresponding to the absolute angle track;
- the rotary encoder further includes a second angle calculator that calculates an absolute angle position of the rotary scale based on the detection signal corresponding to the absolute angle track output from the sensor head; and
- the angle compensator is configured to compensate the rotation angle calculated by the first angle calculator based on the angle error at each rotation angle stored in the angle error storage and output absolute angle information based on the compensated rotation angle and the absolute angle calculated by the second angle calculator. The rotary encoder according to this aspect (fifth aspect) is capable of detecting an absolute angle of the rotary scale (the rotating body as the detection target) with high accuracy.

In the first through fourth aspects, the angle error storage, the angle compensator, the angle error calculator, and the error information storage are provided integrally with the rotary scale, the sensor head, and the first angle calculator to constitute the rotary encoder. However, instead of this configuration, a system (rotary encoder system) may be provided in which: the rotary scale, the sensor head, and the first angle calculator constitute a rotary encoder; and the angle error storage, the angle compensator, the angle error calculator, and the error information storage are provided separately from the rotary encoder. Similarly, in the fifth aspect, a system (rotary encoder system) may be provided in which: the rotary scale, the sensor head, the first angle calculator, and the second angle calculator constitute a rotary encoder; and the angle error storage, the angle compensator, the angle error calculator, and the error information storage are provided separately from the rotary encoder. The systems according to these aspects can be constructed with an existing rotary encoder; therefore, these systems can realize highly accurate angle detection using an existing rotary encoder.

The present invention also provides a rotation angle detection method of detecting a rotation angle of a rotating body as a detection target by using a rotary encoder, wherein the rotary encoder includes: a rotary scale that is connected to a rotating shaft of the rotating body and has a cylindrical surface as a detected surface disposed with a center axis thereof parallel to the rotating shaft and that has a relative angle track formed circumferentially on the cylindrical surface to indicate relative angle information; a sensor head that is arranged to face the cylindrical surface of the rotary scale with an interval therebetween and that detects the relative angle track formed on the cylindrical surface of the rotary scale and outputs a detection signal corresponding to the relative angle track and varying in accordance with a size of the interval; and an angle calculator that calculates a rotation angle of the rotary scale based on the detection signal output from the sensor head, the method includes:
- an error calculation step of calculating in advance an angle error corresponding to the size of the interval at each rotation angle calculated from on the detection signal output from the sensor head based on a correlation between the size of the interval and a magnitude of the detection signal as well as the detection signal; and
- a compensation step of compensating the rotation angle of the rotary scale calculated based on the detection signal output from the sensor head, based on the angle error at a corresponding angle position calculated in the error calculation step.

Advantageous Effects of Invention

The rotary encoder according to the present invention is capable of compensating for the angle error corresponding to the size of the interval between the rotary scale and the sensor head. Therefore, even if the gap between the rotary scale and the sensor head varies during one rotation of the rotary scale due to the rotary scale being coupled in an eccentric position or in a deformed state to the rotating shaft of the rotating body or due to the cylindrical surface as the detected surface of the rotary scale having become eccentric or deformed over time, the rotation angle of the rotary scale, that is to say, the rotation angle of the rotating body as the detection target, can be detected with an expected high accuracy.

Further, unlike the conventional rotary encoder, this rotary encoder enables the highly accurate rotation angle detection without increase in the number of sensor heads. Therefore, the structure of the rotary encoder is not complicated and a great increase in the manufacturing cost of the rotary encoder is prevented, which consequently prevents an increase in energy consumption.

DESCRIPTION OF EMBODIMENTS

Hereinafter, specific embodiments of the present invention will be described with reference to the drawings.

1. First Embodiment

Figure 1:
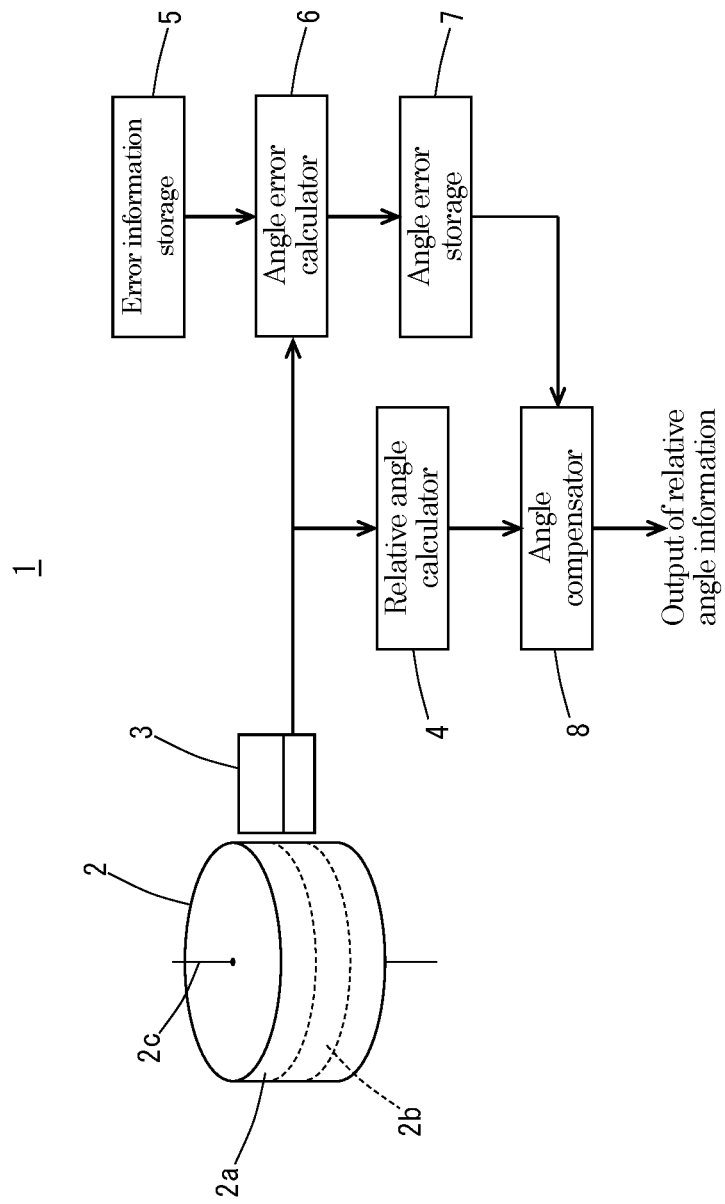
FIG. 1 is a block diagram illustrating principal components of a rotary encoder according to a first embodiment of the present invention.

First, a first embodiment that is illustrated in FIG. 1 is described. As illustrated in FIG. 1, a rotary encoder 1 according to this embodiment includes a rotary scale 2, a sensor head 3, a relative angle calculator 4 as a first angle calculator, an error information storage 5, an angle error calculator 6, an angle error storage 7, and an angle compensator 8. Note that the rotary encoder 1 according to this embodiment is of a magnetic type.

In this embodiment, the relative angle calculator 4, the angle error calculator 6, and the angle compensator 8 are composed of electronic circuits such as a logic circuit, while the error information storage 5 and the angle error storage 7 are composed of electronic circuits such as a storage circuit. The relative angle calculator 4, the angle error calculator 6, the angle compensator 8, the angle error storage 7, and the error information storage 5 as well as the sensor head 3 constitute one electronic device.

Figure 2:
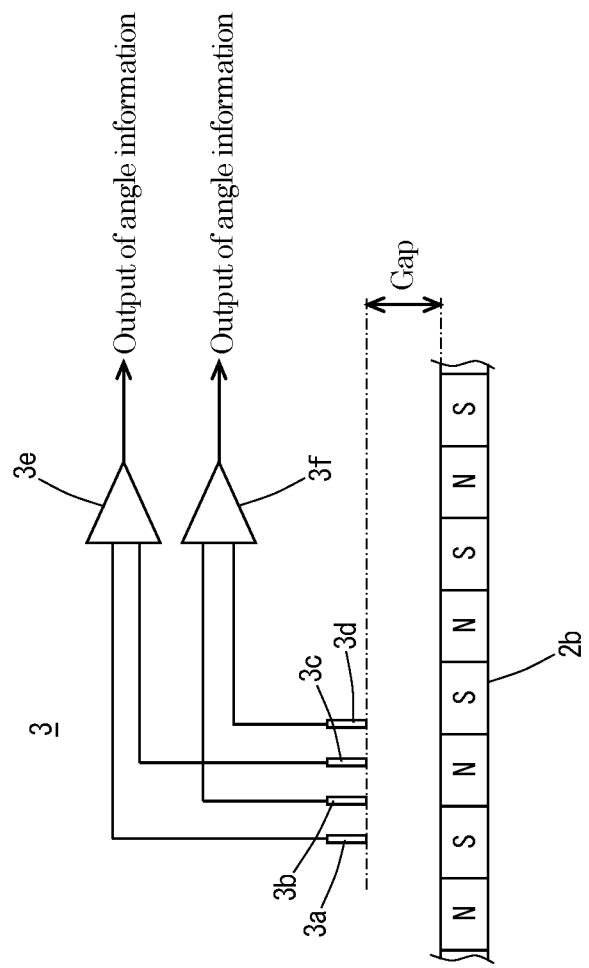
FIG. 2 is an illustrative diagram illustrating a relationship between a sensor head and a rotary scale of the rotary encoder according to the first embodiment.

The rotary scale 2 is composed of a cylindrical body having a cylindrical outer peripheral surface (cylindrical surface) 2a as a detected surface. The rotary scale 2 has a relative angle track 2b formed on the outer peripheral surface 2a. The relative angle track 2b is formed circumferentially at the middle in the direction along the center axis of the outer peripheral surface 2a and serves as a scale indicating relative angle information. The relative angle track 2b is composed of magnetic fields of S poles and N poles recorded alternately and continuously at equal angular pitches as illustrated in FIG. 2. When used, the rotary scale 2 is coupled to a rotating shaft of a rotating body as a detection target such that the center axis 2c thereof is disposed coaxially with the rotating shaft.

As illustrated in FIG. 1, the sensor head 3 is disposed parallel to a tangential direction of the rotary scale 2. The sensor head 3 outputs relative rotation angle information of the rotary scale 2 as a detection signal. As illustrated in FIG. 2, the sensor head 3 has a plurality of (in this embodiment, four) magnetic sensors 3a to 3d, a differential amplifier 3e, and a differential amplifier 3f. The magnetic sensors 3a to 3d are arranged in sequence at equal intervals opposite and along the relative angle track 2b. The differential amplifier 3c obtains and amplifies a difference between output signals from the magnetic sensors 3a and 3c and outputs the amplified difference. The differential amplifier 3f obtains and amplifies a difference between output signals from the magnetic sensors 3b and 3d and outputs the amplified difference.

Figure 5:
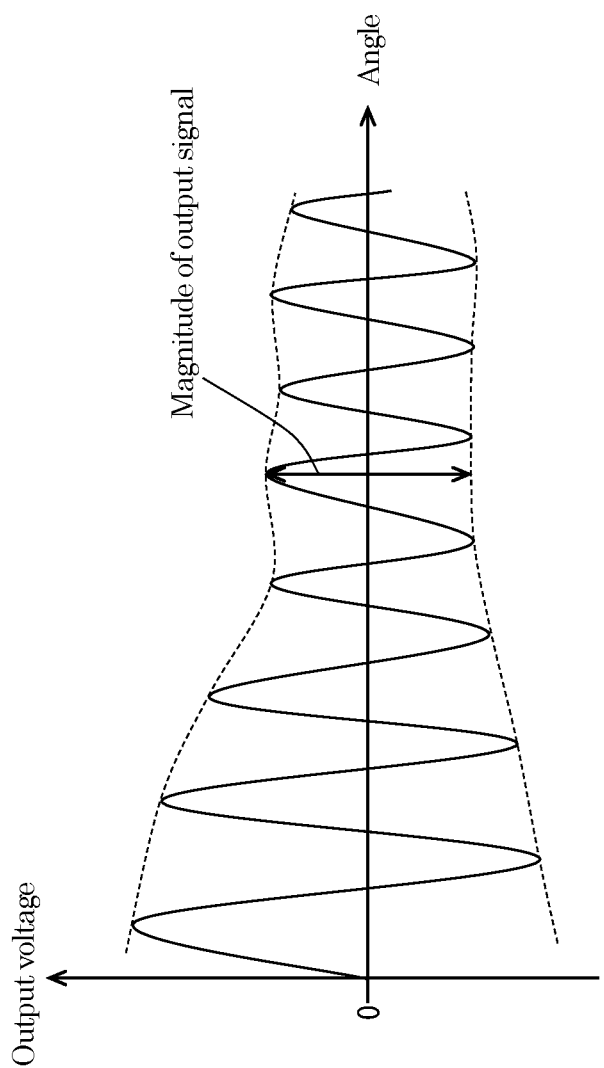
FIG. 5 is an illustrative diagram illustrating an example of a detection signal output from the sensor head.

The magnetic sensors 3a to 3d are each a magneto-resistive element that detects a change in a magnetic field. The magnetic sensors 3a to 3d each convert variation in the magnetic field (in the form of a sine curve) produced by rotation of the relative angle track 2b into an electric signal (voltage signal) and output the voltage signal as a detection signal. DC components of the voltage signals output from the magnetic sensors 3a and 3c are canceled by the differential amplifier 3e. DC components of the voltage signals output from the magnetic sensors 3b and 3d are canceled by the differential amplifier 3f. Thus, a voltage signal (detection signal) as a sin/cos signal as illustrated in FIG. 5 is output from each of the differential amplifiers 3e and 3f. In general, the detection signal output from the differential amplifier 3e is referred to as phase A and the detection signal output from the differential amplifier 3f is referred to as phase B.

The relative angle calculator 4 recognizes the rotating direction of the rotary scale 2 by processing the phase-A and phase-B voltage signals output from the differential amplifiers 3e and 3f. Further, the relative angle calculator 4 calculates a relative rotation angle of the rotary scale 2 based on the phase-A and phase-B voltage signals and also calculates a current rotation angle of the rotary scale 2, for example, with a predetermined angle position (for example, the angle position of the start of the rotation of the rotary scale 2) designated as the origin. The relative angle calculator 4 outputs the calculated rotation angles to the angle compensator 8.

The error information storage 5 stores, in the form of a data table, a correlation between the size of an interval (gap) between the sensor head 3, more precisely the magnetic sensors 3a to 3d, and the outer peripheral surface 2a of the rotary scale 2 and the magnitude of the detection signal (the difference between the maximum and minimum values in FIG. 5) output from the sensor head 3, more precisely the differential amplifiers 3e and 3f.

Figure 3:
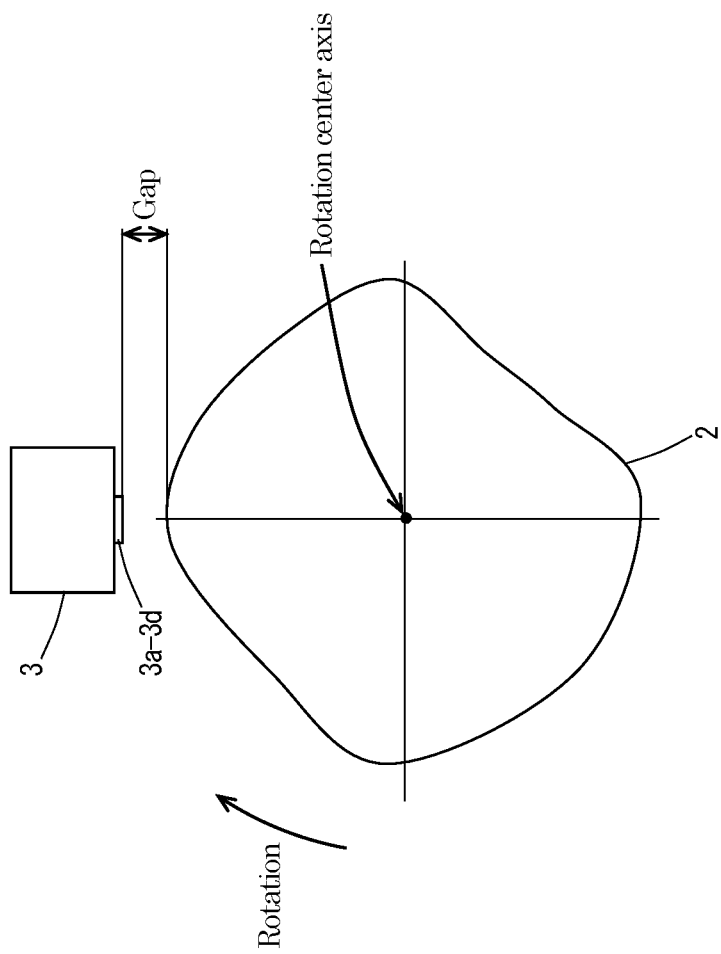
FIG. 3 is an illustrative diagram illustrating the relationship between the sensor head and the rotary scale of the rotary encoder according to the first embodiment.

The outer peripheral surface 2a of the rotary scale 2 may become eccentric or deformed over time as illustrated in FIG. 3. This causes the interval (gap) between the sensor head 3 and the outer peripheral surface 2a of the rotary scale 2 to vary during one rotation of the rotary scale 2. Further, the rotary scale 2 being coupled in an eccentric position or in a deformed state to the rotating shaft of the rotating body as the detection target also causes the gap to vary during one rotation of the rotary scale 2.

Figure 4:
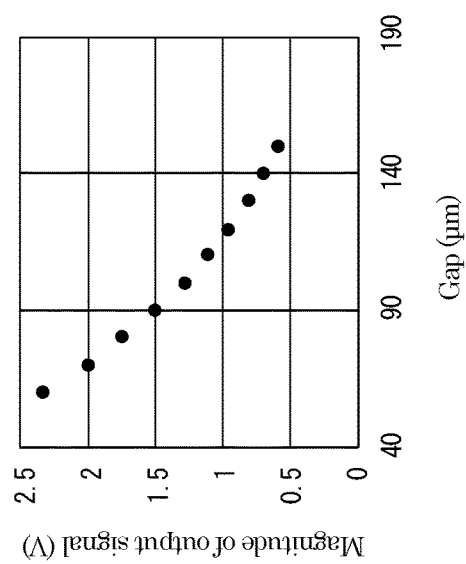
FIG. 4 is an illustrative diagram illustrating a relationship between a gap between the sensor head and the rotary scale and an output signal from the sensor head.

The variation of the gap during one rotation of the rotary scale 2 causes an angle error to be included in the detection signal (angle information) output from the sensor head 3. The mechanism of occurrence of this angle error is described later. The gap between the sensor head 3 and the rotary scale 2 and the magnitude of the detection signal (output signal) output from the sensor head 3 have, for example, a relationship as illustrated FIG. 4, so that the detection signal output from the sensor head 3 varies in the manner as illustrated in FIG. 5 in accordance with the gap between the sensor head 3 and the rotary scale 2. That is to say, the magnitude of the detection signal decreases as the gap increases, and conversely, the magnitude of the detection signal increases as the gap decreases. Therefore, the size of the gap can be estimated from the magnitude of the detection signal output from the sensor head 3.

For example, this correlation can be experimentally obtained in advance. The obtained correlation data may be interpolated to obtain correlation data with a predetermined resolution. Alternatively, a functional equation representing the relationship between the magnitude of the output signal and the gap may be obtained based on the obtained correlation data and used to calculate correlation data with a predetermined resolution. The thus-obtained correlation data is stored in the error information storage 5.

The angle error calculator 6 executes a preprocessing that calculates an angle error corresponding to the gap between the sensor head 3 and the rotary scale 2 at each angle position of the rotary scale 2 detected by the sensor head 3 and stores the calculated angle error into the angle error storage 7. The angle errors corresponding to the angle positions of the rotary scale 2 are stored in the form of a data table in the angle error storage 7.

The mechanism of the variation of the gap between the sensor head 3 and the rotary scale 2 affecting the angle information output from the sensor head 3 is described here.

Figure 6:
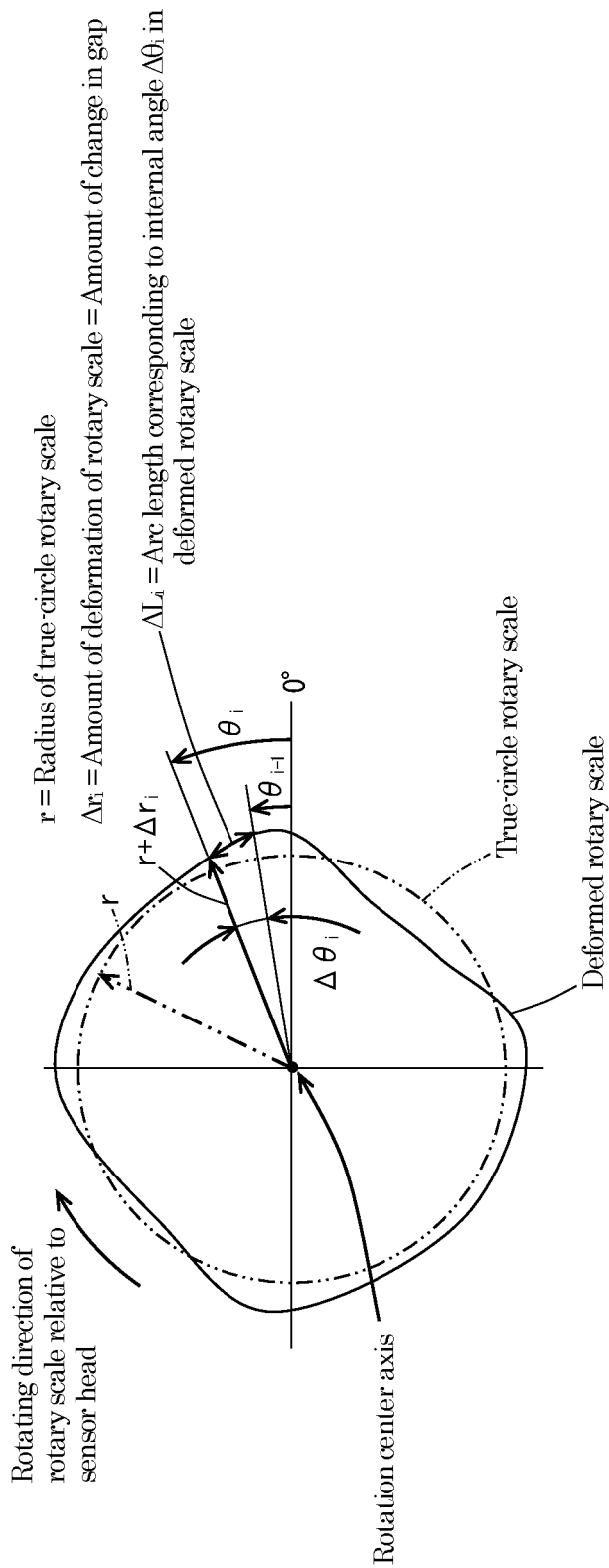
FIG. 6 is an illustrative diagram for explaining an angle error caused by the gap between the sensor head and the rotary scale varying.

As shown in FIG. 6, where the outer circumference of the rotary scale 2 is divided into n with the rotation angle origin designated as 0° and each angle position obtained is denoted by $\theta_i$ [rad] (i=1, 2, . . . , n), the arc length (circumferential length) $\Delta L_i$ of the outer peripheral surface 2a of the rotary scale 2 between the rotation angle $\theta_i$ and the rotation angle $\theta_{i-1}$ can be calculated by Equation 1 below:

$$\Delta L_i = (r + \Delta r_i) \times \Delta \theta_i, \quad \text{(Equation 1)}$$

where: $\Delta\theta_i = \theta_i$ when i=1; $\Delta\theta_i = \theta_i - \theta_{i-1}$ when i≥2; $\theta_i > \theta_{i-1}$; and $\theta_n = 2\pi$.

Further, r is a true circle radius of the rotary scale 2 (in FIG. 6, the true circle is indicated by a dashed and double-dotted line), and $\Delta_{ri}$ is an amount of deformation of the rotary scale 2 in the radial direction at the rotation angle $\theta_i$ and also an amount of change in the gap.

As can be seen from the Equation 1 above, the circumferential length $\Delta L_i$ of the outer peripheral surface 2a of the rotary scale 2 differs by the amount of $\Delta r_i \times \theta_i$ in accordance with the amount of deformation $\Delta r_i$ from that of the true circle of the rotary scale 2. Consequently, the length of the relative angle track 2b detected by the sensor head 3 differs by the amount of this difference. This causes an angle error to be included in the detection signal output from the sensor head 3.

Here, the rotation angle calculated by the relative angle calculator 4 based on the detection signal output from the sensor head 3 is denoted by $\theta_i$ and the angle error included in the rotation angle $\theta_i$ is denoted by $d_i$. The angle error $d_i$ [rad] can be calculated by Equation 2 below:

$$d_i = 2\pi \sum_{k=1}^{i} \Delta L_k / \sum_{k=1}^{n} \Delta L_k - \theta_i \quad \text{(Equation 2)}$$

where k=1, 2, . . . , n.

Note that $\Delta L_k$ can be calculated by the Equation 1 above.

Further, $\sum_{k=1}^{i} \Delta L_k$ represents the circumferential length of the rotary scale 2 from the rotation angle position of 0° as the origin to the rotation angle $\theta_i$, and $\sum_{k=1}^{n} \Delta L_k$ represents the full circumferential length of the rotary scale 2.

Accordingly, $2\pi \sum_{k=1}^{i} \Delta L_k / \sum_{k=1}^{n} \Delta L_k$ corresponds to the true rotation angle of the rotary scale 2 at the rotation angle $\theta_i$ calculated by the relative angle calculator 4. Thus, the angle error $d_i$ included in the rotation angle $\theta_i$ calculated by the relative angle calculator 4 can be calculated by the Equation 2 above.

In the above-described preprocessing, the angle error calculator 6 calculates the rotation angle $\theta_i$ of the rotary scale 2 based on the detection signal output from the sensor head 3 by causing the rotary scale 2 to make one rotation and recognizes the amount of the gap corresponding to the detection signal output from the sensor head 3 by referring to the correlation data stored in the error information storage 5. Thereafter, while calculating the amount of change $\Delta r_i$ in the gap based on the recognized amount of the gap, the angle error calculator 6 sequentially calculates the angle error $d_i$ included in the rotation angle $\theta_i$ using the Equation 1 and the Equation 2, and associates the rotation angle $\theta_i$ and the angle error $d_i$ with each other and stores them in the form of a data table into the angle error storage 7.

The angle compensator 8 receives the rotation angle $\theta_i$ calculated by and output from the relative angle calculator 4. The angle compensator 8 recognizes the angle error $d_i$ corresponding to the received rotation angle $\theta_i$ by referring to the angle error storage 7 based on the received rotation angle $\theta_i$ and compensates the rotation angle $\theta_i$ with the recognized angle error $d_i$, and sequentially outputs the compensated rotation angle $\theta_{ci}$.

The rotary encoder 1 according to this embodiment having the above-described configuration is used with the rotary scale 2 coupled to a rotating shaft of a rotating body as a detection target. First, the preprocessing is executed by causing the rotating body and the rotary scale 2 to make one rotation. The angle error calculator 6 calculates the rotation angle $\theta_i$ of the rotary scale 2 based on the detection signal output from the sensor head 3 and recognizes the amount of the gap corresponding to the detection signal output from the sensor head 3 based on the correlation data stored in the error information storage 5. Based on the recognized amount of the gap, the angle error calculator 6 calculates the amount of change $\Delta r_i$ in the gap and calculates the angle error $d_i$ corresponding to the rotation angle $\theta_i$ using the Equation 1 and the Equation 2. The calculated rotation angle $\theta_i$ and angle error $d_i$ are associated with each other and stored in the form of a data table into the angle error storage 7.

Thereafter, when the rotating body as the detection target rotates in a predetermined used state, the sensor head 3 outputs the detection signal in accordance with rotation of the rotary scale 2. Based on the output detection signal, the relative angle calculator 4 sequentially calculates the rotation angle $\theta_i$ of the rotating body, i.e., the rotation angle $\theta_i$ of the rotary scale 2. The angle compensator 8 recognizes the angle error $d_i$ corresponding to the rotation angle $\theta_i$ by referring to the angle error storage 7 and compensates the rotation angle $\theta_i$ with the recognized angle error $d_i$, and outputs the compensated rotation angle $\theta_{ci}$.

In this embodiment, while the rotary encoder 1 is normally used, the angle error calculator 6 continuously calculates the angle error $d_i$ corresponding to the amount of change $\Delta r_i$ in the gap while calculating the rotation angle $\theta_i$ of the rotary scale 2 based on the detection signal output from the sensor head 3 and recognizing the amount of the gap corresponding to the detection signal output from the sensor head 3 based on the correlation data stored in the error information storage 5, thereby replacing and updating the angle error $d_i$ stored in the angle error storage 7 with the newly calculated angle error $d_i$ for each one rotation of the rotary scale 2.

As described in detail above, the rotary encoder 1 according to this embodiment is capable of compensating for the angle error $d_i$ generated in correspondence with the size of the interval (the amount of the gap) between the rotary scale 2 and the sensor head 3. Therefore, even if the gap between the rotary scale 2 and the sensor head 3 varies during one rotation of the rotary scale 2 due to the rotary scale 2 being coupled in an eccentric position or in a deformed state to the rotating shaft of the rotating body or due to the outer peripheral surface (cylindrical surface) 2a as the detected surface of the rotary scale 2 having become eccentric or deformed over time, the rotation angle of the rotary scale 2, that is to say, the rotation angle of the rotating body as the detection target, can be detected with an expected high accuracy.

Further, unlike the conventional rotary encoder, this rotary encoder 1 enables the highly accurate rotation angle detection without increase in the number of sensor heads. Therefore, the structure of the rotary encoder 1 is not complicated and a great increase of the manufacturing cost of the rotary encoder 1 is prevented.

Further, while the rotary encoder 1 is normally used, the angle error calculator 6 continuously calculates the angle error $d_i$ corresponding to the amount of change $\Delta r_i$ in the gap to update the angle error $d_i$ stored in the angle error storage 7 with the newly calculated angle error $d_i$ for each one rotation of the rotary scale 2. Therefore, even when the angle error $d_i$ sequentially changes due to stress deformation of the rotary scale 2 caused by a change in temperature or a change in the rotational speed, the angle error $d_i$ is compensated for accurately.

2. Second Embodiment

Figure 7:
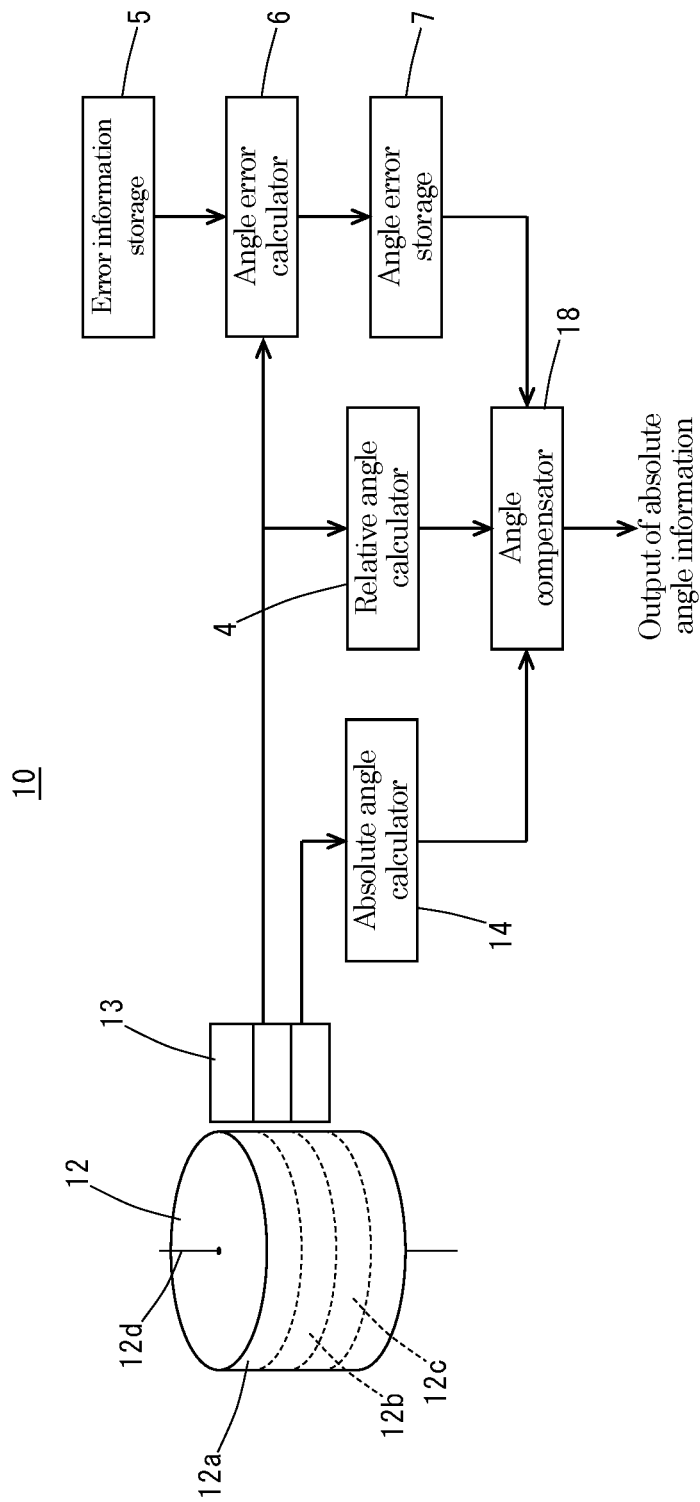
FIG. 7 is a block diagram illustrating principal components of a rotary encoder according to a second embodiment of the present invention.

Next, a rotary encoder according to a second embodiment of the present invention is described with reference to FIG. 7. As illustrated in FIG. 7, the rotary encoder 10 according to this embodiment includes a rotary scale 12, a sensor head 13, a relative angle calculator 4, an error information storage 5, an angle error calculator 6, an angle error storage 7, an absolute angle calculator 14 as a second angle calculator, and an angle compensator 18. The relative angle calculator 4, the error information storage 5, the angle error calculator 6, and the angle error storage 7 have the same configurations as those of the rotary encoder 1 according to the first embodiment; therefore, these elements are denoted by the same reference numerals as in the first embodiment and detailed description thereof is omitted here. The rotary encoder 10 is also of a magnetic type similarly to the rotary encoder 1 described above.

Also in this embodiment, the relative angle calculator 4, the angle error calculator 6, the absolute angle calculator 14, and the angle compensator 18 are composed of electronic circuits such as a logic circuit, while the error information storage 5 and the angle error storage 7 are composed of electronic circuits such as a storage circuit. The relative angle calculator 4, the angle error calculator 6, the absolute angle calculator 14, the angle compensator 18, the angle error storage 7, and the error information storage 5 as well as the sensor head 3 constitute one electronic device.

Similarly to the rotary scale 2 described above, the rotary scale 12 is composed of a cylindrical body having a cylindrical outer peripheral surface (cylindrical surface) 12a as a detected surface. The rotary scale 12 has a relative angle track 2b formed on the outer peripheral surface 12a. The relative angle track 2b is formed circumferentially in the vicinity of the middle in the direction along the center axis of the outer peripheral surface 12a and serves as a scale indicating the relative angle information as described above. Note that the relative angle track 2b has the same configuration as that in the first embodiment. The rotary scale 12 additionally has an absolute angle track 12c as magnetic information formed (recorded) thereon. The absolute angle track 12c is formed in the vicinity of and parallel to the relative angle track 2b. The absolute angle track 12c is composed of an origin track indicating an absolute angle of the rotary scale 12 or composed of a absolute track having a pattern such as an M code recorded thereon. In FIG. 7, reference numeral 12d denotes the center axis of the rotary scale 12.

The sensor head 13 is arranged parallel to a tangential direction of the rotary scale 12. The sensor heard 13 outputs relative rotation angle information and absolute rotation angle information of the rotary scale 12 as a detection signal. Although not specifically illustrated, the sensor head 13 has a configuration similar to the configuration of the sensor head 3 in the first embodiment described above and illustrated in FIG. 2. That is to say, the sensor head 13 has a plurality of (in this embodiment, four) magnetic sensors 3a to 3d, a differential amplifier 3e, and a differential amplifier 3f. The magnetic sensors 3a to 3d are arranged in sequence at equal intervals opposite and along the relative angle track 2b. The differential amplifier 3c obtains and amplifies a difference between output signals from the magnetic sensors 3a and 3c and outputs the amplified difference. The differential amplifier 3f obtains and amplifies a difference between output signals from the magnetic sensors 3b and 3d and outputs the amplified difference.

The sensor head 13 additionally has a magnetic sensor arranged opposite and along the absolute angle track 12c. The sensor head 13 outputs an origin signal or outputs a pattern signal such as an M code serving as absolute angle information.

The absolute angle calculator 14 recognizes an origin rotation angle or an absolute rotation angle based on a signal detected by the magnetic sensor opposite the absolute angle track 12c of the sensor head 13 and transmits the recognized rotation angle to the angle compensator 18.

The angle compensator 18 calculates a primary absolute rotation angle of the rotary scale based on the origin rotation angle transmitted from the absolute angle calculator 14 and the relative rotation angle transmitted from the relative angle calculator 4 and recognizes the angle error $d_i$ corresponding to the amount of change $\Delta r_i$ in the gap at the relative rotation angle $\theta_i$ by referring to the angle error storage 7, compensates the absolute rotation angle of the rotary scale 12 with the recognized angle error $d_i$, and outputs the compensated absolute rotation angle.

As described above, this rotary encoder 10 is capable of compensating for the angle error $d_i$ generated in correspondence with the size of the interval (the amount of the gap) between the rotary scale 12 and the sensor head 13. Therefore, even if the gap between the rotary scale 12 and the sensor head 13 varies during one rotation of the rotary scale 12 due to the rotary scale 12 being coupled in an eccentric position or in a deformed state to the rotating shaft of the rotating body or due to the outer peripheral surface (cylindrical surface) 12a as the detected surface of the rotary scale 12 having become eccentric or deformed over time, the absolute rotation angle of the rotary scale 12, that is to say, the absolute rotation angle of the rotating body as the detection target, can be detected with an expected high accuracy.

Further, the rotary encoder 10 records the gap information with respect to the absolute angle information at the time of manufacturing in advance, and obtains the amount of change in the gap from the time of manufacturing based on the gap information with respect to the absolute angle information at the time of use and calculates the angle error $d_i$ using the amount of change as $\Delta r_i$. Therefore, even if the scales are recorded under the existence of eccentricity or deformation at the time of manufacturing of the rotary scale 12, an error caused by eccentricity or deformation can be compensated for accurately.

Above have been described specific embodiments of the present invention. However, it should be noted that the present invention is not limited to the above-described embodiments and can be implemented in other manners.

For example, in the first embodiment, the sensor head 3, the relative angle calculator 4, the angle error calculator 6, the angle compensator 8, the angle error storage 7, and the error information storage 5 constitute one electronic device. However, the present invention is not limited to this configuration. For example, a configuration is possible in which the sensor head 3 and the relative angle calculator 4 constitute one electronic device and the error information storage 5, the angle error calculator 6, the angle error storage 7, and the angle compensator 8 constitute another electronic device. Alternatively, the error information storage 5, the angle error calculator 6, the angle error storage 7, and the angle compensator 8 may be composed of a computer including a CPU, a RAM, and a ROM. In this case, the functions of the angle error calculator 6 and the angle compensator 8 are implemented by a computer program and the error information storage 5 and the angle error storage 7 are composed of an appropriate storage medium such as a RAM. In these cases, the rotary scale 2, the sensor head 3, and the relative angle calculator 4 may be regarded as constituting a rotary encoder, and this rotary encoder together with the angle error calculator 6, the angle compensator 8, the angle error storage 7, and the error information storage 5 may be regarded as constituting a rotary encoder system.

Similarly, in the second embodiment, the sensor head 13, the relative angle calculator 4, the angle error calculator 6, the absolute angle calculator 14, the angle compensator 18, the angle error storage 7, and the error information storage 5 constitute one electronic device. However, the present invention is not limited to this configuration. A configuration is possible in which the sensor head 13, the absolute angle calculator 14, and the relative angle calculator 4 constitute one electronic device and the error information storage 5, the angle error calculator 6, the angle error storage 7, and the angle compensator 18 constitute another electronic device. Alternatively, the error information storage 5, the angle error calculator 6, the angle error storage 7, and the angle compensator 18 may be composed of a computer including a CPU, a RAM, and a ROM. In this case, the functions of the angle error calculator 6 and the angle compensator 18 are implemented by a computer program and the error information storage 5 and the angle error storage 7 are composed of an appropriate storage medium such as a RAM. In these cases, the rotary scale 12, the sensor head 13, the absolute angle calculator 14, and the relative angle calculator 4 may be regarded as constituting a rotary encoder, and this rotary encoder together with the angle error calculator 6, the angle compensator 18, the angle error storage 7, and the error information storage 5 may be regarded as constituting a rotary encoder system.

Further, in each of the above-described embodiments, the error information storage 5 may be omitted. In these cases, the angle error calculator 6 is configured to calculate the angle error corresponding to the amount of change in the gap between the sensor head 3, 13 and the rotary scale 2, 12 at each rotation angle of the rotary scale 2, 12 detected by the sensor head 3, 13 by using the previously-obtained functional equation representing the relationship between the magnitude of the output signal from the sensor head 3, 13 and the gap, and store the calculated angle error into the angle error storage 7.

Further, in each of the above-described embodiments, the error information storage 5 and the angle error calculator 6 may be omitted. For example, the angle error corresponding to the amount of change of the gap between the sensor head 3, 13 and the rotary scale 2, 12 at each rotation angle of the rotary scale 2, 12 detected by the sensor head 3, 13 is calculated using the correlation between the magnitude of the output signal from the sensor head 3, 13 and the gap or the functional equation representing the correlation by a processing similar to the processing in the angle error calculator 6, and the calculated angle error is stored into the angle error storage 7.

Further, in each of the above-described embodiments, the rotary encoder is of a magnetic type. However, the present invention is not limited to such a rotary encoder and can be applied to and embodied in rotary encoders of various detection types, such as an optical type, a capacitance type, and an electromagnetic induction type, which output a signal varying in accordance with the gap.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Rotary encoder
2 Rotary scale
3 Sensor head
4 Relative angle calculator
5 Error information storage
6 Angle error calculator
7 Angle error storage
8 Angle compensator
10 Rotary encoder
12 Rotary scale
13 Sensor head
14 Absolute angle calculator
18 Angle compensator

What is claimed is:

1. A rotary encoder comprising:
a rotary scale connected to a rotating shaft of a rotating body as a detection target and having a cylindrical surface as a detected surface disposed with a center axis thereof parallel to the rotating shaft, the rotary scale having a relative angle track formed circumferentially on the cylindrical surface to indicate relative angle information;
a sensor head arranged to face the cylindrical surface of the rotary scale with an interval therebetween and configured to detect the relative angle track formed on the cylindrical surface of the rotary scale and output a detection signal corresponding to the relative angle track and varying in accordance with a size of the interval; and
a first angle calculator configured to calculate a rotation angle of the rotary scale based on the detection signal output from the sensor head,
the rotary encoder further comprising:
an angle error storage storing an angle error corresponding to the size of the interval at each rotation angle calculated based on the detection signal output from the sensor head; and
an angle compensator configured to compensate the rotation angle calculated by the first angle calculator, based on the angle error at each rotation angle stored in the angle error storage,
the angle error stored in the angle error storage being the angle error corresponding to the size of the interval at each rotation angle calculated from the detection signal output from the sensor head based on a correlation between the size of the interval and a magnitude of the detection signal as well as the detection signal.

2. The rotary encoder according to claim 1, further comprising an angle error calculator configured to calculate the angle error corresponding to the size of the interval at each rotation angle calculated from the detection signal output from the sensor head based on the correlation between the size of the interval and the magnitude of the detection signal as well as the detection signal and store the calculated angle error into the angle error storage.

3. The rotary encoder according to claim 2, wherein:
the rotary encoder further comprises an error information storage storing the correlation between the size of the interval and the magnitude of the detection signal; and
the angle error calculator is configured to calculate the angle error by referring to the correlation between the size of the interval and the magnitude of the detection signal stored in the error information storage.

4. The rotary encoder according to claim 3, wherein the angle error calculator is configured to update the angle error stored in the angle error storage by replacing the angle error with a new angle error calculated for every one rotation of the rotary scale.

5. The rotary encoder according to any one of claim 4, wherein:
the rotary scale has an absolute angle track formed adjacent to the relative angle track on the cylindrical surface to indicate absolute angle information;
the sensor head is configured to detect the absolute angle track besides the relative angle track and output a detection signal corresponding to the absolute angle track;
the rotary encoder further comprises a second angle calculator configured to calculate an absolute angle position of the rotary scale based on the detection signal corresponding to the absolute angle track output from the sensor head; and
the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

6. The rotary encoder according to any one of claim 2, wherein:
the rotary scale has an absolute angle track formed adjacent to the relative angle track on the cylindrical surface to indicate absolute angle information;
the sensor head is configured to detect the absolute angle track besides the relative angle track and output a detection signal corresponding to the absolute angle track;
the rotary encoder further comprises a second angle calculator configured to calculate an absolute angle position of the rotary scale based on the detection signal corresponding to the absolute angle track output from the sensor head; and
the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

7. The rotary encoder according to any one of claim 3, wherein:
the rotary scale has an absolute angle track formed adjacent to the relative angle track on the cylindrical surface to indicate absolute angle information;
the sensor head is configured to detect the absolute angle track besides the relative angle track and output a detection signal corresponding to the absolute angle track;
the rotary encoder further comprises a second angle calculator configured to calculate an absolute angle position of the rotary scale based on the detection signal corresponding to the absolute angle track output from the sensor head; and
the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

8. The rotary encoder according to any one of claim 1, wherein:
the rotary scale has an absolute angle track formed adjacent to the relative angle track on the cylindrical surface to indicate absolute angle information;
the sensor head is configured to detect the absolute angle track besides the relative angle track and output a detection signal corresponding to the absolute angle track;
the rotary encoder further comprises a second angle calculator configured to calculate an absolute angle position of the rotary scale based on the detection signal corresponding to the absolute angle track output from the sensor head; and the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

9. A rotary encoder system comprising:
a rotary encoder including:
a rotary scale connected to a rotating shaft of a rotating body as a detection target and having a cylindrical surface as a detected surface disposed with a center axis thereof parallel to the rotating shaft, the rotary scale having a relative angle track formed circumferentially on the cylindrical surface to indicate relative angle information;
a sensor head arranged to face the cylindrical surface of the rotary scale with an interval therebetween and configured to detect the relative angle track formed on the cylindrical surface of the rotary scale and output a detection signal corresponding to the relative angle track and varying in accordance with a size of the interval; and
a first angle calculator configured to calculate a rotation angle of the rotary scale based on the detection signal output from the sensor head;
an angle error storage storing an angle error corresponding to the size of the interval at each rotation angle calculated based on the detection signal output from the sensor head; and
an angle compensator configured to compensate the rotation angle calculated by the first angle calculator of the rotary encoder, based on the angle error at each rotation angle stored in the angle error storage,
the angle error stored in the angle error storage being the angle error corresponding to the size of the interval at each rotation angle calculated from the detection signal output from the sensor head based on a correlation between the size of the interval and a magnitude of the detection signal as well as the detection signal.

10. The rotary encoder system according to claim 9, further comprising an angle error calculator configured to calculate the angle error corresponding to the size of the interval at each rotation angle calculated from the detection signal output from the sensor head based on the correlation between the size of the interval and the magnitude of the detection signal as well as the detection signal and store the calculated angle error into the angle error storage.

11. The rotary encoder system according to claim 10, wherein:
the rotary encoder system further comprises an error information storage storing the correlation between the size of the interval and the magnitude of the detection signal; and
the angle error calculator is configured to calculate the angle error by referring to the correlation between the size of the interval and the magnitude of the detection signal stored in the error information storage.

12. The rotary encoder system according to claim 11, wherein the angle error calculator is configured to update the angle error stored in the angle error storage by replacing the angle error with a new angle error calculated for every one rotation of the rotary scale.

13. The rotary encoder system according to any one of claim 12, wherein:
the rotary scale of the rotary encoder has an absolute angle track formed adjacent to the relative angle track on the cylindrical surface to indicate absolute angle information;
the sensor head of the rotary encoder is configured to detect the absolute angle track besides the relative angle track and output a detection signal corresponding to the absolute angle track;
the rotary encoder further includes a second angle calculator configured to calculate an absolute angle position of the rotary scale based on the detection signal corresponding to the absolute angle track output from the sensor head; and
the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

14. The rotary encoder system according to any one of claim 10, wherein:
the rotary scale of the rotary encoder has an absolute angle track formed adjacent to the relative angle track on the cylindrical surface to indicate absolute angle information;
the sensor head of the rotary encoder is configured to detect the absolute angle track besides the relative angle track and output a detection signal corresponding to the absolute angle track;
the rotary encoder further includes a second angle calculator configured to calculate an absolute angle position of the rotary scale based on the detection signal corresponding to the absolute angle track output from the sensor head; and
the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

15. The rotary encoder system according to any one of claim 11, wherein:
the rotary scale of the rotary encoder has an absolute angle track formed adjacent to the relative angle track on the cylindrical surface to indicate absolute angle information;
the sensor head of the rotary encoder is configured to detect the absolute angle track besides the relative angle track and output a detection signal corresponding to the absolute angle track;
the rotary encoder further includes a second angle calculator configured to calculate an absolute angle position of the rotary scale based on the detection signal corresponding to the absolute angle track output from the sensor head; and
the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

16. The rotary encoder system according to any one of claim 9, wherein:

the rotary scale of the rotary encoder has an absolute angle track formed adjacent to the relative angle track on the cylindrical surface to indicate absolute angle information;

the sensor head of the rotary encoder is configured to detect the absolute angle track besides the relative angle track and output a detection signal corresponding to the absolute angle track;

the rotary encoder further includes a second angle calculator configured to calculate an absolute angle position of the rotary scale based on the detection signal corresponding to the absolute angle track output from the sensor head; and the angle compensator is configured to calculate an absolute angle based on the absolute angle position calculated by the second angle calculator and the rotation angle calculated by the first angle calculator and output absolute angle information obtained by compensating the rotation angle calculated by the first angle calculator based on the angle error at each rotation angle stored in the angle error storage.

17. A rotation angle detection method of detecting a rotation angle of a rotating body as a detection target by using a rotary encoder, the rotary encoder including: a rotary scale connected to a rotating shaft of the rotating body and having a cylindrical surface as a detected surface disposed with a center axis thereof parallel to the rotating shaft and having a relative angle track formed circumferentially on the cylindrical surface to indicate relative angle information; a sensor head arranged to face the cylindrical surface of the rotary scale with an interval therebetween and configured to detect the relative angle track formed on the cylindrical surface of the rotary scale and output a detection signal corresponding to the relative angle track and varying in accordance with a size of the interval; and an angle calculator configured to calculate a rotation angle of the rotary scale based on the detection signal output from the sensor head, the method comprising:

an angle error calculation step of calculating in advance an angle error corresponding to the size of the interval at each rotation angle calculated from the detection signal output from the sensor head based on a correlation between the size of the interval and a magnitude of the detection signal as well as the detection signal; and an angle compensation step of compensating the rotation angle of the rotary scale calculated based on the detection signal output from the sensor head, based on the angle error at a corresponding angle position calculated in the angle error calculation step.

* * * * *